United States Patent
Jakob et al.

(10) Patent No.: US 12,095,522 B2
(45) Date of Patent: Sep. 17, 2024

(54) MODULATION OF SUPPLY CURRENT IN ACTIVE ANTENNA SYSTEMS

(71) Applicant: MOLEX CVS HILDESHEIM GMBH, Hildesheim (DE)

(72) Inventors: Daniel Jakob, Nuremberg (DE); Joerg Meißner, Altdorf (CH); Josef Hecht, Erlangen (DE)

(73) Assignee: MOLEX CVS HILDESHEIM GMBH, Hildesheim (DE)

( * ) Notice: Subject to any disclaimer, the term of this patent is extended or adjusted under 35 U.S.C. 154(b) by 40 days.

(21) Appl. No.: 17/847,178

(22) Filed: Jun. 23, 2022

(65) Prior Publication Data

US 2022/0416843 A1    Dec. 29, 2022

Related U.S. Application Data

(60) Provisional application No. 63/214,994, filed on Jun. 25, 2021.

(51) Int. Cl.
*H04B 3/54*  (2006.01)
*B60R 16/03*  (2006.01)

(52) U.S. Cl.
CPC ............. *H04B 3/54* (2013.01); *B60R 16/03* (2013.01)

(58) Field of Classification Search
CPC ........ B60R 16/03; H04B 1/3822; H04B 1/44; H04B 2001/0408; H04B 3/54
See application file for complete search history.

(56) References Cited

U.S. PATENT DOCUMENTS

| | | | |
|---|---|---|---|
| 10,868,575 B2 | 12/2020 | Stählin et al. | |
| 2018/0209820 A1* | 7/2018 | Hammerschmidt | ... G01D 5/145 |
| 2019/0305823 A1* | 10/2019 | Blaser | ...... H04B 1/40 |

FOREIGN PATENT DOCUMENTS

| | | |
|---|---|---|
| EP | 3331316 A1 | 6/2018 |
| EP | 3823172 A1 | 5/2021 |
| EP | 3823173 A1 | 5/2021 |

OTHER PUBLICATIONS

Extended European Search Report and Opinion received for EP Application No. 22181045.0, mailed on Nov. 25, 2022, 8 pages.

* cited by examiner

*Primary Examiner* — David S Huang

(57) ABSTRACT

Exemplary embodiments are disclosed of current control circuits and methods of modulating supply current from a first device (e.g., a telematics control unit (TCU), etc.) to one or more second devices (e.g., one or more compensators, etc.). In an exemplary embodiment, a method includes modulating a supply current from a first device to a second device into different current values for reporting different information from the second device to the first device. An exemplary embodiment of a current control circuit includes a variable voltage source electrically coupled with a current source and a current sink. The current control circuit is configured to modulate the supply current from a first device to the second device into different current values for reporting different information from the second device to the first device.

18 Claims, 7 Drawing Sheets

MODULATION OF SUPPLY CURRENT IN
ACTIVE ANTENNA SYSTEMS

RELATED APPLICATIONS

This application claims priority to U.S. Provisional Application No. 63/214,994 filed Jun. 25, 2021, which is incorporated herein by reference in its entirety.

TECHNICAL FIELD

This disclosure relates to modulation of supply current in active antenna systems.

BACKGROUND ART

As motor vehicles become more data driven, the need to communicate with the external world becomes increasingly important. Individuals in vehicles often rely on personal mobile devices for streaming of music, communication with others and even navigation. The motor vehicles themselves can also be in contact with external systems. Such communication allows for over-the-air updates from a central server, information about external conditions relevant to the vehicle through vehicle to everything (V2X) communication and navigational information. If the vehicle is intended to have autonomous driving features, then having the ability to provide sensed data to a central server can allow for receipt of improved driving algorithms. Thus, there are numerous reasons for providing data to and from a motor vehicle.

Unfortunately, motor vehicles tend to be less than ideal from a transmission and reception standpoint. The substantial sheet metal of vehicles tends to greatly increase transmission loss and thus many vehicles use externally mounted antennas to avoid the losses. For example, it is common for vehicles to include a small fin antenna (often known as a shark fin antenna) on the roof of a vehicle to reduce the losses.

As vehicles increase the number of antennas, however, this creates a more complicated system. For example, if V2X and regular cellular communication is desired, it is likely that two antenna systems will be used. These antenna systems will often be mounted in locations that are spaced apart and, for example, one could be mounted toward the front of a vehicle while another was mounted toward the rear of a vehicle. If a single transceiver is used to operate both antennas, the insertion loss in the cable system between the network access device (NAD) and one or both antennas will suggest the benefits of using one or more compensator systems to ensure desirable performance. As the operation of the communication system can be important to safety systems in a vehicle, it is often desirable to know how each system is operating in a cost-effective manner. As a result, certain individuals would appreciate further improvements in compensation systems.

SUMMARY

This section provides a general summary of the disclosure, and is not a comprehensive disclosure of its full scope or all of its features.

Exemplary embodiments are disclosed of current control circuits and methods of modulating supply current from a first device (e.g., a telematics control unit (TCU), etc.) to one or more second devices (e.g., one or more compensators, etc.). In an exemplary embodiment, a method incudes modulating a supply current from a first device to one or more second devices into different current values for reporting different information from the one or more second devices to the first device.

An exemplary embodiment of a current control circuit includes a variable voltage source electrically coupled with a current source and a current sink. The current control circuit is configured to be operable for modulating a supply current from a first device to one or more second devices into different current values for reporting different information from the one or more second devices to the first device.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present application is illustrated by way of example and not limited in the accompanying figures in which like reference numerals indicate similar elements and in which.

Corresponding reference numerals may indicate corresponding though not necessarily identical) parts throughout the several views of the drawings.

DETAILED DESCRIPTION OF THE PREFERRED EMBODIMENTS

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

Today's TCUs are able to monitor the electrical current of V2X compensators, but current implementations may require higher power components that are able to handle power dissipation greater than 700 milliwatts (mW). As can be appreciated, higher power dissipation components are expensive and larger in size. In addition, existing implementations depend on the voltage supply and require an additional communication path (e.g., UART/LIN, UART on a pilot tone).

After recognizing the above, exemplary embodiments of current control circuits and methods were developed and/or are disclosed herein that are configured for modulating a supply current from a first device (e.g., TCU, central unit of a distributed antenna system, etc.) to a second device (e.g., one or more compensators, etc.). In exemplary embodiments, the current control circuit includes a variable voltage source electrically coupled (e.g., via a transistor, etc.) with a current source and a current sink. The variable voltage source (e.g., digital to analog converter (DAC), adjustable voltage regulator, programmable voltage regulator, voltage divider, etc.) is operable to adjust or modulate the supply current into different current values for reporting different information (e.g., error messages, status information, control information, etc.) from the second device (which may be two or more devices) to the first device. The current control circuit may be configured to respond with a predefined current value independent from and without depending on the power supply voltage coming from the current source.

Figure 5A:
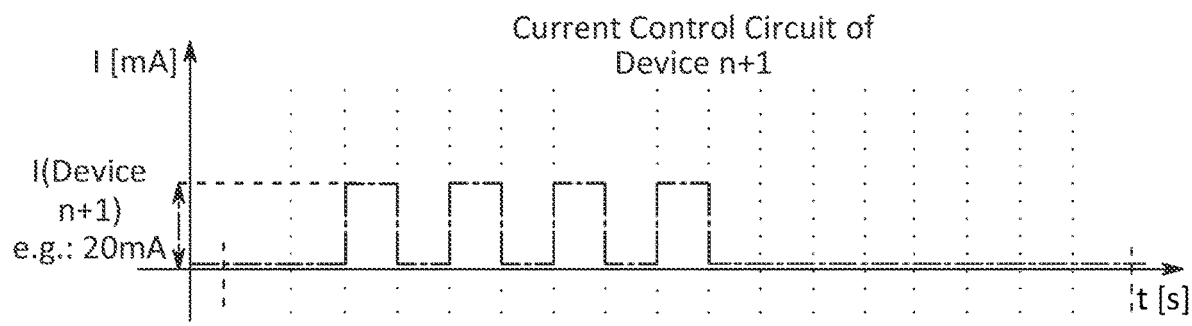
FIGS. 5A, 5B, 5C, and 5D include lines graphs of current distribution in milliAmps (mA) versus time in seconds (s) for the current control circuits of the multiple devices shown in FIG. 3, specifically, current control circuit of Device n+1 (FIG. 5A), current control circuit of Device n+2 (FIG. 5B), current control circuit of Device n+3 (FIG. 5C), and total current distribution of all three devices across a time interval of constant base current (FIG. 5D).
Figure 5B:
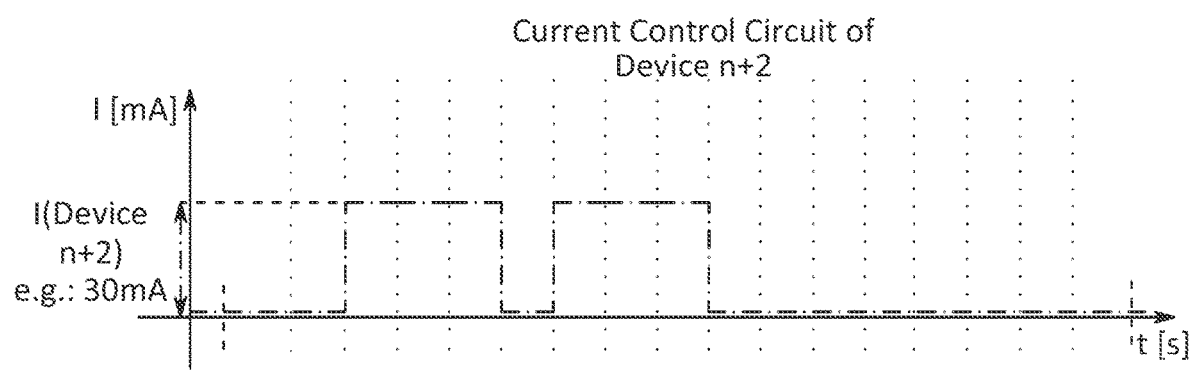
Figure 5C:
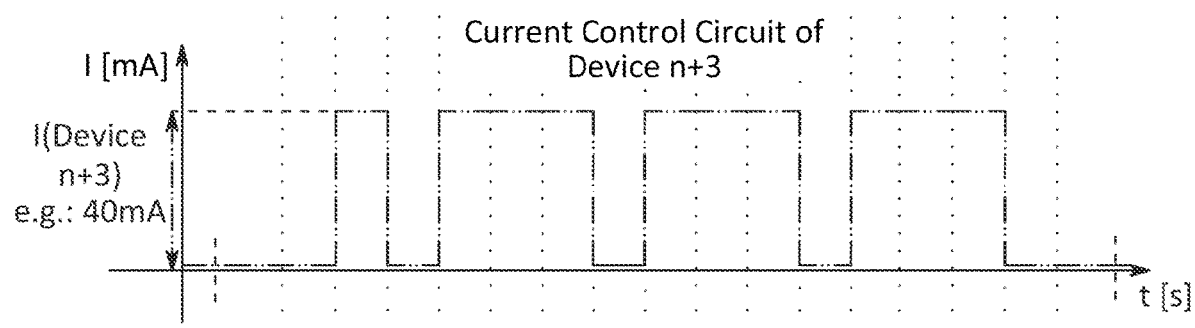

In an exemplary embodiment, the current control circuit is connected with a UART-TX port of a microcontroller (MCU) to modulate an UART-frame onto the fixed current (e.g., FIGS. 5A, 5B, and 5C, etc.). In this example, the variable voltage source of the current control circuit may replace or be used with diodes in the current control circuit of the MCU. One or more resistors of the current control circuit of the MCU may be changed depending on the wanted/needed current strength.

In another exemplary embodiment, the current control circuit is connected with a DAC-port of a microcontroller such that the timing and current strength are controllable (e.g., FIGS. 5A, 5B, 5C, and 7, etc.). Also in this example, the variable voltage source (e.g., DAC, etc.) may replace diodes in a current control circuit of the MCU, which variable voltage source is operable for to adjust or modulate the supply current into different values for reporting different information (e.g., error messages, status information, control information, etc.) from the one or more second devices to the first device.

The variable voltage source may be a digital to analog converter (DAC), adjustable voltage regulator, programmable voltage regulator, specific voltage divider, etc. For example, a specific voltage divider may be used at the UART-TX port of a microcontroller for multiple devices with different current values for reporting of their different status reports. Or, for example, the variable voltage source may be an adjustable voltage regulator, and a circuit may be used to control resistor values at the adjustable voltage regulator (and not resistors of the current sink). The resistors at the adjustable voltage regulators are not necessarily required to be in the high current/power range.

Advantageously, exemplary embodiments disclosed herein may solve or alleviate problems or drawbacks associated with conventional implementations. Exemplary embodiments disclosed herein may provide one or more (but not necessarily any or all) of the following advantages or features as compared to conventional systems. For example, exemplary embodiments include components with low power capability and avoid the use of more costly and larger high power dissipation parts, thereby reducing costs and saving space. In exemplary embodiments, no additional communication path is required (e.g., UART/LIN, UART on a pilot tone) for reporting information from the V2X compensator to the TCU. Exemplary embodiments are configured to use the electrical current draw independent from and without depending on the power supply voltage coming from the current source.

In exemplary embodiments, the first device may comprise a telematics control unit, and the second device may comprise at least one V2X compensator. The supply current from the TCU to the V2X compensator may be modulated by a device on or included within the V2X compensator for reporting information from the V2X compensator to the TCU. The information may include status information, control information, an error message, etc. With the modulation of the supply current from the V2X compensator, the information may be transmitted from the V2X compensator to the TCU using the same single coaxial line or cable that also provides the supply voltage from the TCU to the V2X compensator. Accordingly, the information may be transmitted from the V2X compensator to the TCU without the additional costs for an additional communications path like UART/LIN or UART on a pilot tone.

Figure 1:
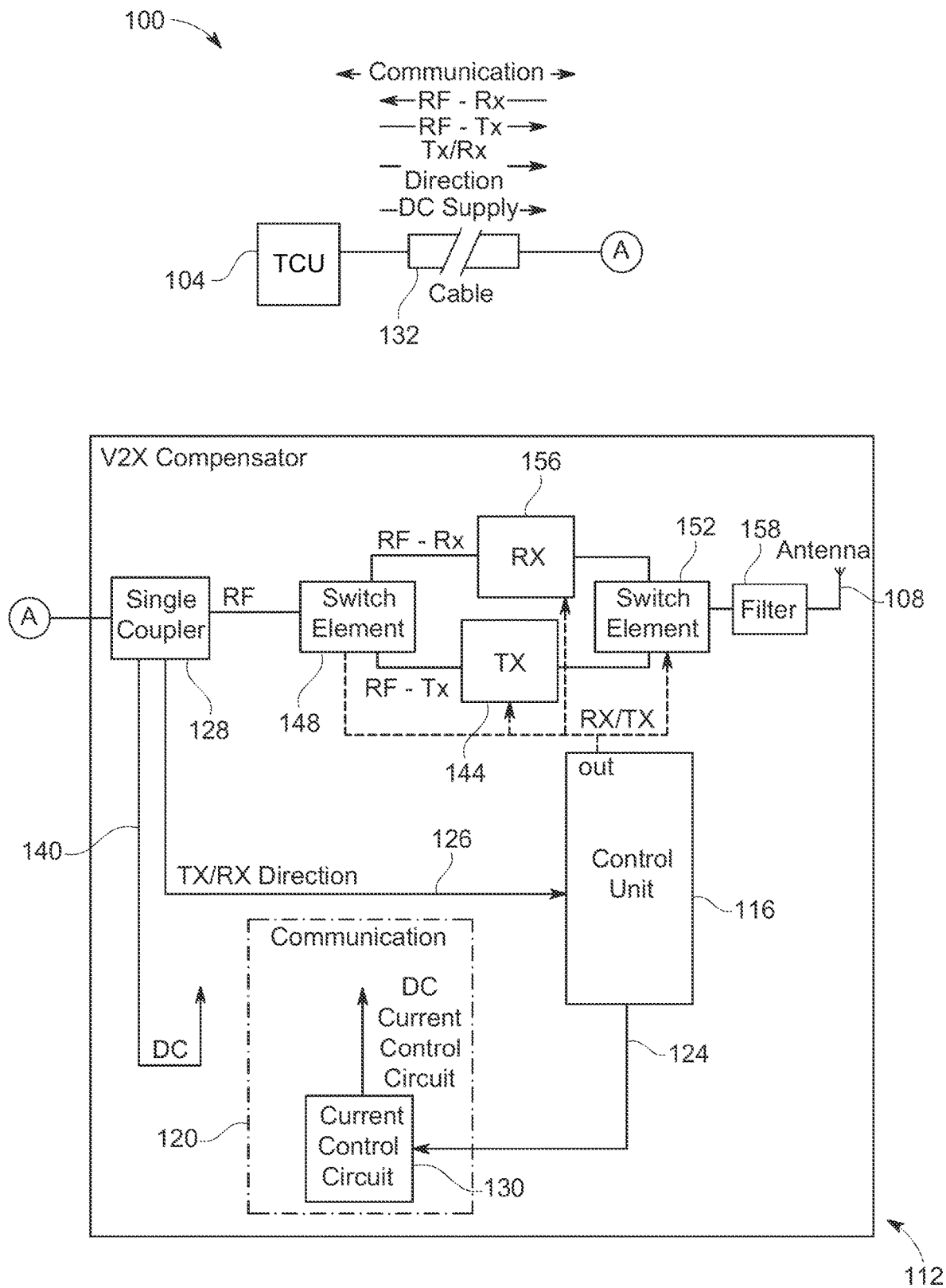
FIG. 1 is a block diagram of an example vehicular communication system including a V2X compensator with a current control circuit configured to modulate DC supply current from the TCU to the V2X compensator according to an exemplary embodiment of the present disclosure.

With reference now to the figures, FIG. 1 illustrates an example vehicular communication system 100 (broadly, a system) including a telematics control unit (TCU) 104 (which is an example of a first device), an antenna 108, and a V2X compensator 112 (which is an example of a second device) according to an exemplary embodiment. The V2X compensator 112 is disposed generally between the TCU 104 and the antenna 108. The TCU 104 is electrically coupled with the V2X compensator 112 via a single coaxial line or cable 132.

The V2X compensator 112 includes a control unit 116 (e.g., a microcontroller (MCU), etc.) and a device 120 in communication with the control unit 116 via a communication pathway 124. The control unit 116 is also in communication with a signal coupler 128 via a communication pathway 128.

The device 120 includes a current control circuit 130 configured to modulate DC supply current to the V2X compensator 112 into different current values for reporting different information (e.g., status information, control information, an error message, etc.) from the V2X compensator 112 to the TCU 104. In this exemplary embodiment, the supply voltage is provided from the TCU 104 to the V2X compensator 112 via a coaxial line or cable 132 coupled to the signal coupler 128. Accordingly, information may be transmitted from the V2X compensator 112 to the TCU 104 using the same single coaxial line or cable 132 that also provides the supply voltage from the TCU 104 to the V2X compensator 112.

From the signal coupler 128, the DC supply current is provided to the current control circuit 130 via electrical pathway 140. The signal coupler 128, for example, may be a PCB trace RF coupler, a chip based directional coupler, or a bi-directional coupler, etc.

A gain modifier 144 of the V2X compensator 112 may be configured to be operable for adjusting the gain of the signal so that the signal being emitted from the antenna 108 more closely matches the signal the transceiver intended to send. The gain modifier 144 may include a variable gain amplifier, an attenuator, and an amplifier along the Tx (transmit) path between first and second switch elements 148, 152. The first and second switch elements 148, 152 may comprise RF switches to selectively activate the transmit path (Tx-path) or the receive path (Rx-path). The variable gain amplifier, attenuator, and amplifier are in series such that the attenuator may be operable to attenuate signals received from the variable gain amplifier, which attenuated signals may thereafter be sent from the attenuator to the amplifier for amplification. The attenuator may be a variable attenuator, a step attenuator, or a fixed attenuator. The attenuator may be controlled by voltage, current, digital signals, etc.

In other exemplary embodiments, the gain modifier 144 may include less components, more components, and/or different components. For example, the gain modifier 144 may include one or more (but not necessarily all) of the variable gain amplifier, the attenuator, the amplifier, or combination thereof in alternative embodiments. A gain modifier may also or alternatively be provided along the Rx (receive) path 156 between the first and second switch elements 148, 152. Another alternative position for a gain modifier is between the signal coupler 128 and the first switch element 148.

A filter 158 is between the second switch element 152 and the antenna 108. In this exemplary embodiment, the V2X compensator 112 integrally includes the antenna 108. In alternative embodiments, the antenna 108 may be external to the V2X compensator 112. In which case, the V2X compensator 112 may be placed relatively close to the external antenna 108 and connected with the antenna via a coaxial cable or other suitable link. For the external antenna 108, the current control circuit 130 may be used for confirming whether or not the external antenna 108 is still present after an accident, and if not, then this state is reportable with the current modulation by a variable voltage source of the current control circuit 130.

In exemplary embodiments, various components shown in FIG. 1 may be entirely integrated or included in a single integrated assembly or module. For example, the V2X compensator 112, the control unit 116, the device 120 including the current control circuit 130, the signal coupler 128, the gain modifier 144, the switch elements 148, 152, the filter 158, and the antenna 108 may all be entirely integrated or included in a single integrated assembly or module. Alternatively, the one or more of these various components (e.g., antenna 108, etc.) shown in FIG. 1 may be discrete separate components that are not integrated into or an integral component of the V2X compensator 112.

Figure 2:
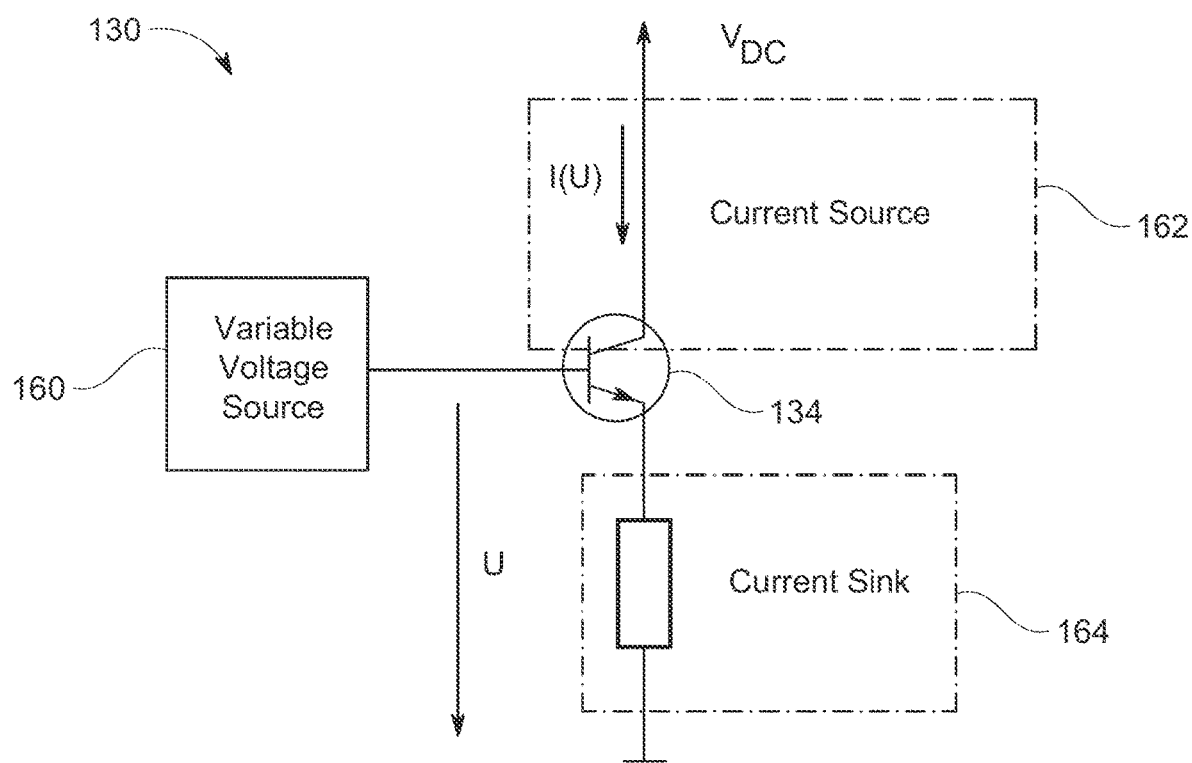
FIG. 2 is a circuit diagram illustrating an exemplary embodiment of a current control circuit that may be used in the V2X compensator shown in FIG. 1 or other device (e.g., another compensator, an antenna of a distributed antenna system, etc.).

FIG. 2 illustrates an example current control circuit 130 that may be included within the V2X compensator 112 shown in FIG. 1 according to an exemplary embodiment of the present disclosure. But the V2X compensator 112 is only an example of a device in which the current control circuit 130 shown in FIG. 2 may be included, as the current control device 130 may be included within or used with various other devices. For example, the current control circuit 130 (and other current control circuits disclosed herein) may be used in other compensators, antennas of a distributed antenna system, etc.

With continued reference to FIG. 2, the current control circuit 130 includes a variable voltage source 160 and a transistor 134 electrically coupling the variable voltage source 160 with a current source 162 and a current sink 164.

The variable voltage source 160 is operable to adjust or modulate a supply current from a first device (e.g., TCU 104, other TCU, central unit of a distributed antenna system (DAS), other device, etc.) to one or more second devices (e.g., V2X compensator 112, another compensator, DAS antenna, other device, etc.) into different current values for reporting different information from the one or more second devices to the first device. The current control circuit 130 may be configured to send the first device information (e.g., error message, control information, status information, etc.) using the current draw.

By way of example only, the transistor 134 may comprise a NPN bipolar transistor (BJT), a PNP transistor, a metal-oxide field-effect transistor (MOFSET), other suitable current-driven or voltage-driven devices, etc. The variable voltage source 160 may be a digital to analog converter (DAC), adjustable voltage regulator, programmable voltage regulator, specific voltage divider, etc.

With the constant current source 162 in this exemplary embodiment, a constant current may be provided independent from the power supply voltage from the current source depending on the state a control unit (e.g., control unit 116 of V2X compensator 112 (FIG. 1) wants to report to the first device (e.g., TCU 104, etc.). In addition, the transistor 134 is able to handle the largest part of the power dissipation such that the resistors of the current sink 164 will only need to handle a relatively small portion (e.g., less than 150 mW with 200 mA, etc.) of the power dissipation. Alternative embodiments may be configured differently than what is shown in FIG. 2 depending on the power dissipation needs. For example, other exemplary embodiments may include or need resistors for more than 700 mW of power dissipation.

By using the variable voltage source 160 (e.g., digital to analog converter (DAC), etc.), the current from the current source 162 can be modulated into more different values to report different information. By way of example, the information may include status information, control information, error messages (e.g., error in the transmission path (TX-path), error in the reception path (RX-Path), antenna missing, overheating, watch dog executed we will be back soon, etc.), periodic reporting of OK or no-error status, reporting of significant change in cable loss, etc.

Figure 3:
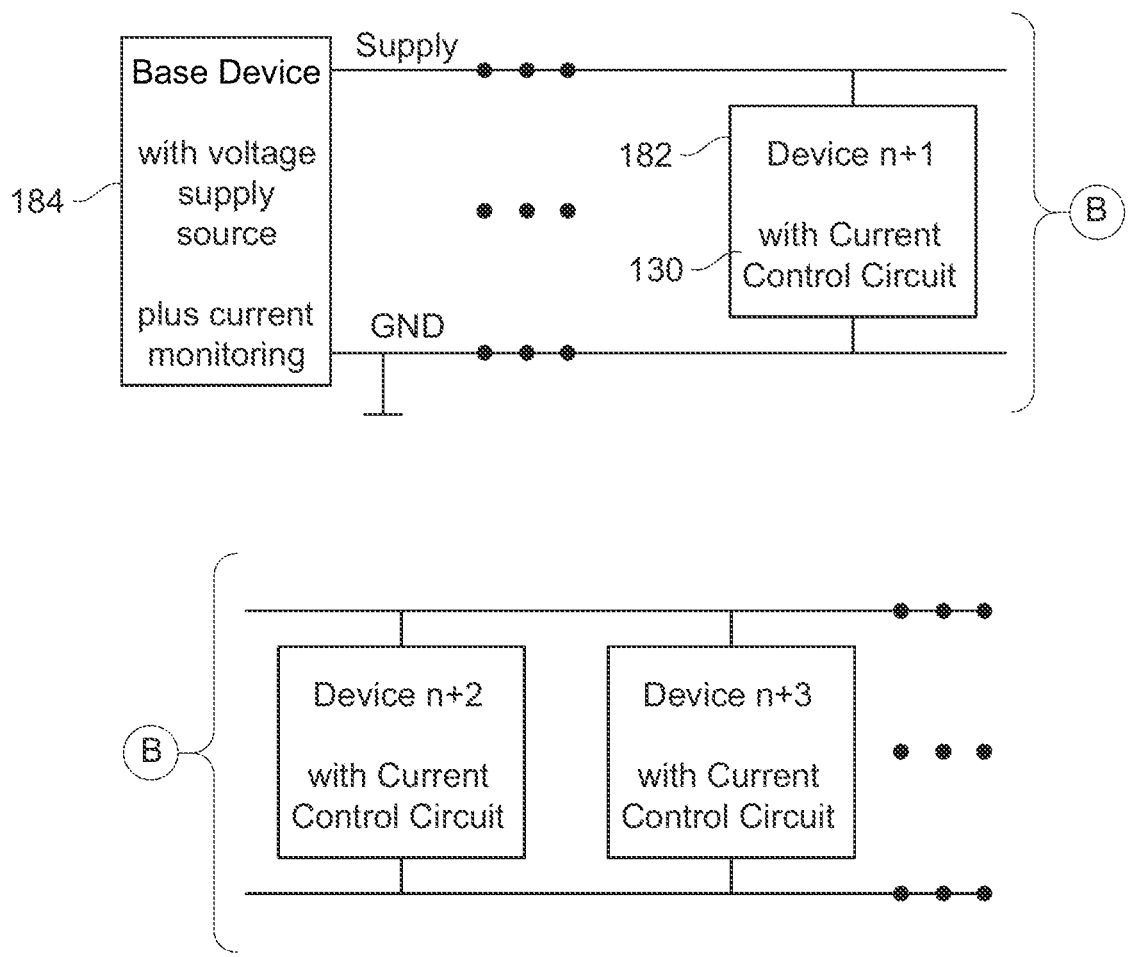
FIG. 3 is a block diagram of an example implementation in which multiple devices include current control circuits and are electrically coupled to ground and to a voltage supply of a base device according to an exemplary embodiment of the present disclosure.

FIG. 3 illustrates an example implementation in which multiple second devices 182 (e.g., multiple compensators, multiple DAS antennas, etc.) include current control circuits 130. The second devices 182 are electrically coupled to ground and to a voltage supply source of a base device or first device 184 (e.g., TCU, DAS central unit, etc.).

Figure 4:
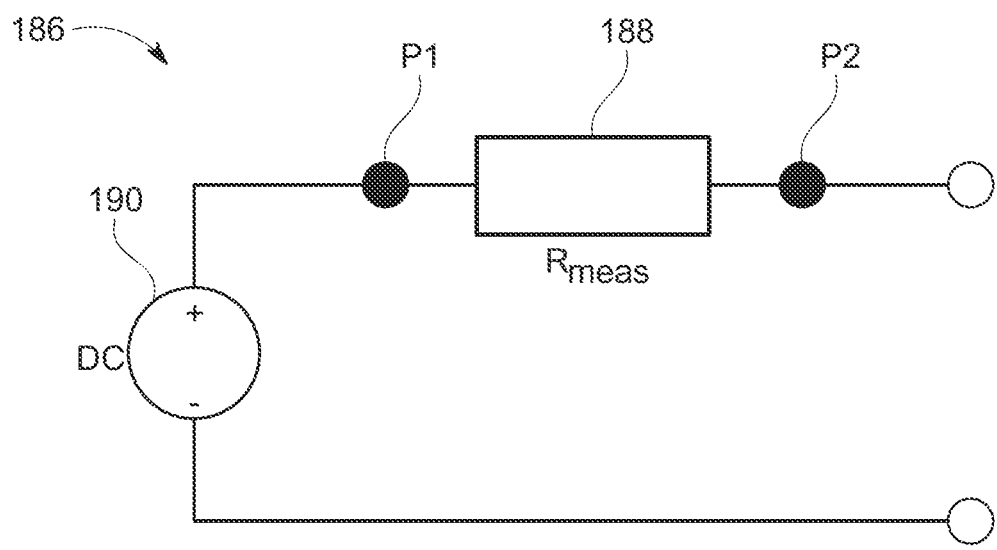
FIG. 4 is a circuit diagram illustrating an example current monitoring circuit of the base device shown in FIG. 3.

In this example, the base device 184 includes current monitoring. For example, the base device 184 may include a current monitoring circuit 186 as shown in FIG. 4. In this example, the current monitoring circuit 186 includes a resistor 188 in series with a DC voltage source 190. Total current is determined by dividing the voltage drop ($U_{P1}-U_{P2}$) of the resistor 188 by the resistance ($R_{meas}$) of f the resistor 188.

In other exemplary embodiments, the multiple second devices 182 may include current monitoring in addition to or instead of the current monitoring being provided by the base device 184. In such alternative embodiments, the multiple second devices 182 may be configured to monitor and control current. In addition, the multiple second devices 182 may be configured to monitor or listen to the other second devices 182.

Figure 5D:
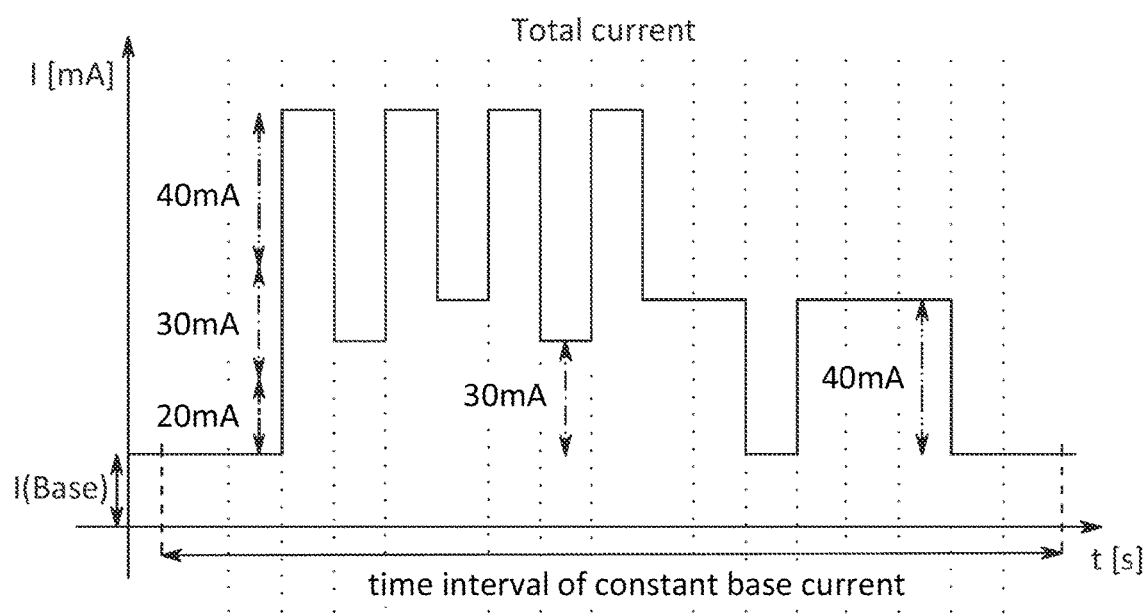

FIGS. 5A, 5B, 5C, and 5D include lines graphs of current distribution in milliAmps (mA) versus time in seconds (s) for the current control circuits 130 of the multiple devices 182 shown in FIG. 4. More specifically, FIG. 5A is a line graph of the current distribution of the current control circuit of Device n+1. FIG. 5B is a line graph of the current distribution of the current control circuit of Device n+2. FIG. 5C is a line graph of the current distribution of the current control circuit of Device n+3. As shown in FIG. 5C, the first time interval is shorter than the other time intervals. FIG. 5D is a line graph of the total current distribution of all three devices 182 across a time interval of constant base current.

The three different devices 182 share the same voltage supply source of the base device 184. And, each device 182 has a different current value (e.g., 20 mA (FIG. 5A), 30 mA (FIG. 5B), 40 mA (FIG. 5C), etc.) than the other devices 182 for reporting its own information. By using a different current value for each device 182, the base device 184 (or the other devices connected to the power supply) can differentiate the different devices 182 from each other and determine which of the devices 182 is sending which information. The current control circuits 130 of the devices 182 are configured to modulate the supply current such that a sum of any two or more of the different current values is unique and not equal to any one of the different current values. In this example, any sum of 20 mA, 30 mA and 40 mA will not be equal to a current value of any one of the devices 182. If a fourth device is added, the fourth device could not have a current value of 50 mA (sum of Devices 1 and 2, i.e., 20 mA+30 mA=50 mA), 60 mA (sum of Devices 1 and 3, i.e., 20 mA+40 mA=60 mA), 70 mA (sums of Devices 2 and 3, i.e., 30 mA+40 mA=70 mA), or 90 mA (sum of Devices 1, 2, and 3, i.e., 20 mA+30 mA+40 mA=90 mA). Accordingly, the fourth device could have a current value of 80 mA, 100 mA, or more than 100 mA. If a fifth device is added, it would be necessary to use another unique value for the fifth device considering the fourth device as well.

Figure 6:
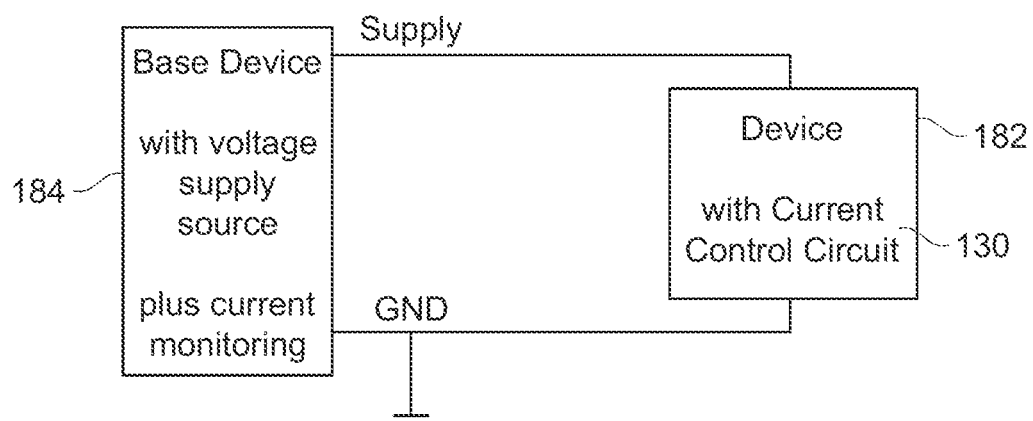
FIG. 6 is a block diagram of an example implementation in which a single device includes a current control circuit and is electrically coupled to ground and to a voltage supply of the base device according to an exemplary embodiment of the present disclosure.

FIG. 6 illustrates an example implementation in which a single device 182 (e.g., compensator, etc.) includes a current control circuit 130. The device 182 is electrically coupled to ground and to a voltage supply of a base device or first device 184 (e.g., TCU, etc.).

The base device 184 includes current monitoring. For example, the base device 184 may include the current monitoring circuit 186 as shown in FIG. 4.

Figure 7:
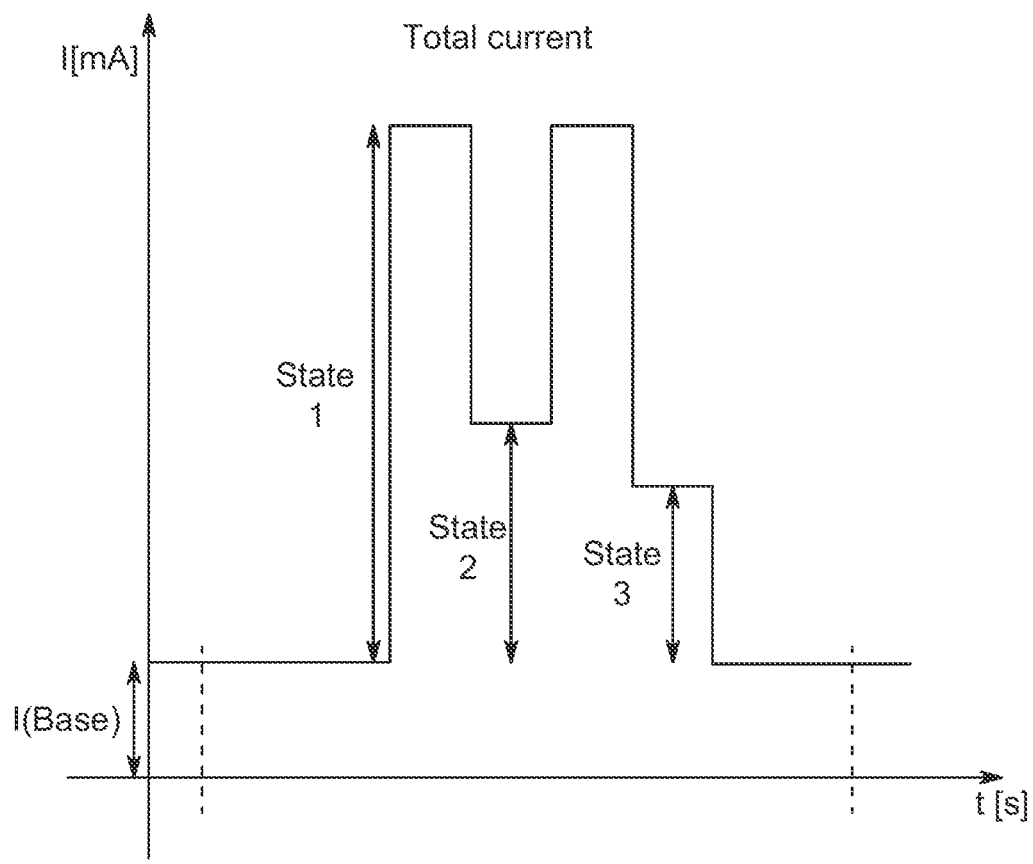
FIG. 7 is a line graph of the total current distribution in milliAmps (mA) versus time in seconds (s) for the current control circuit of the single device shown in FIG. 6 at different electrical current states of the single device.

FIG. 7 is a line graph of the total current distribution in milliAmps (mA) versus time in seconds (s) for the current control circuit 130 of the single device 182 shown in FIG. 6 at different electrical current states of the single device 182. In this example, the single device 182 uses different current values to report different states, e.g., 90 mA for state 1, 40 mA for state 2, 30 mA for state 3, etc. Alternatively, the different states may be separated by the time length of the current instead of different current values. And if desired, both different current states and different time periods could be used for more complex information sharing situations. For less complex situations, however, it may be preferable to use different current values because the different current values are likely to be more easily detectable, e.g., by a TCU or other first device, etc.

The vehicle communication system 100, the TCU 104, and V2X compensator 112 shown in FIG. 1 are only examples of a system and devices in which an exemplary embodiment of a current control circuit (e.g., current control circuit 130 (FIG. 2), etc.) may be used. The exemplary embodiments of the current control circuits disclosed herein may be included within or used with various other devices.

For example, another exemplary embodiment includes a distributed antenna system (broadly, a system) including a plurality of antennas (broadly, second devices) connected to a central unit or modem (broadly, a first device). In this example, the central unit or modem may include a voltage supply source that provides a supply voltage to the antennas. Each antenna includes a current control circuit that comprises a variable voltage source electrically coupled (e.g., via transistor, etc.) with a current source and a current sink.

The current control circuits of the antennas are configured to be operable for modulating the supply current from the central unit to the antennas into a plurality of different current values such each antenna has a unique current value for reporting information (e.g., status information, control information, an error message, etc.) to the central unit. This enables the central unit to differentiate the antennas from each other and thereby determine which antenna is reporting which information.

The current control circuits of the antennas are configured to modulate the supply current into the plurality of different current values such that a sum of any two or more of the different current values is unique and not equal to any one of the different current values. The current control circuits of the antennas are configured to be operable for modulating the supply current from the central unit independent from the supply voltage from the central unit to the antennas.

The distributed antenna system may be installed in a vehicle such that the antennas are spaced apart from each other and distributed around the vehicle. For example, a first antenna may be located towards the front of the vehicle, e.g., on the vehicle hood. A second antenna may be located towards the back of the vehicle, e.g., on the vehicle trunk. A third antenna may be located on top of the vehicle, e.g., on the vehicle roof Fourth and fifth antennas may be respectively located along the passenger and driver sides of the vehicle, e.g., on the side view mirrors. By distributing the antennas around the vehicle, the vehicular distributed antenna system may be operable for providing 180/360 degree hemispherical coverage.

The exemplary embodiments of the current control circuits and methods disclosed herein may be used with a wide range of platforms, including automobiles, buses, trains, motorcycles, boats, among other mobile platforms. Accordingly, the references to vehicles herein should not be construed as limiting the scope of the present disclosure to any specific type of platform.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A method comprising modulating a supply current from a first device to a second device into a plurality of current values for reporting different information from the second device to the first device, wherein modulating the supply current includes modulating the supply current from the first device to the second device independent from a supply voltage from the first device to the second device.

2. The method of claim 1, wherein the first device comprises a telematics control unit (TCU) and the second device comprises a compensator.

3. The method of claim 2, wherein modulating the supply current includes modulating the supply current from the TCU to the compensator independent from the supply voltage from the TCU to the compensator.

4. The method of claim 3, wherein the method includes transmitting the different information from the compensator to the TCU using a single coaxial line that also provides the supply voltage from the TCU to the compensator.

5. The method of claim 1, wherein the first device comprises a central unit of a distributed antenna system and the second device comprises a plurality of antennas of the distributed antenna system connected with the central unit.

6. The method of claim 1, wherein the second device comprises one or more V2X compensators.

7. The method of claim 1, wherein the second device is a plurality of second devices and the first device includes a voltage supply source that provides a supply voltage to the plurality of second devices, and the modulating of the supply current includes modulating the supply current from the first device to the plurality of second devices into a plurality of different current values such that each of the plurality of second devices has a unique current value for reporting information to the first device, which enables the first device to differentiate the second devices from each other and thereby determine which second device is reporting which information.

8. The method of claim 1, wherein the second device is a plurality of second devices, further comprising one of the plurality of second devices communicating with another of the plurality of second devices.

9. The method of claim 1, wherein the modulating of the supply current modulates the current into the plurality of different current values such that a sum of any two or more of the different current values is unique and not equal to any one of the different current values.

10. The method of claim 1, wherein modulating the supply current includes using a variable voltage source electrically coupled with a current source and a current sink.

11. The method of claim 10, wherein modulating the supply current includes using the variable voltage source to modulate the supply current into different current values for reporting the different information from the second device to the first device.

12. The method of claim 10, wherein the variable voltage source comprises a digital to analog converter electrically coupled via a transistor with the current source and the current sink.

13. The method of claim 1, wherein the different information includes one or more of a status information, a control information, and an error message.

14. The method of claim 13, wherein the different information includes an error message reporting one or more of an error in a transmission path, an error in a reception path, a missing antenna, overheating, and a change in cable loss.

15. A current control circuit comprising:
- a variable voltage source electrically coupled with a current source and a current sink, whereby the current control circuit is configured to be operable for modulating a supply current from a first device to a second device into different current values for reporting different information from the second device to the first device, wherein the current control circuit is configured to modulate the supply current from the first device to the second device independent from a supply voltage from the first device to the second device.

16. The current control circuit of claim 15, wherein the current control circuit comprises a transistor electrically coupling the variable voltage source with the current source and the current sink and the variable voltage source comprises a digital to analog converter electrically coupled with the current source and the current sink.

17. The current control circuit of claim 15, wherein:
- the second device is a plurality of second devices;
- the first device includes a voltage supply source that provides a supply voltage to the plurality of second devices; and
- the current control circuit is configured to modulate the supply current from the first device to the plurality of second devices into a plurality of different current values such that each of the second devices has a unique current value for reporting information to the first device, which enables the first device to differentiate the second devices from each other and thereby determine which second device is reporting which information.

18. The current control circuit of claim 17, wherein the current control circuit is configured to be operable for modulating the supply current into the plurality of different current values such that a sum of any two or more of the different current values is unique and not equal to any one of the different current values.

\* \* \* \* \*